United States Patent
Hung et al.

(10) Patent No.: US 9,244,580 B2
(45) Date of Patent: Jan. 26, 2016

(54) CAPACITIVE TOUCH CONTROL SYSTEM AND DRIVING APPARATUS THEREOF

(71) Applicant: MStar Semiconductor, Inc., Hsinchu Hsien (TW)

(72) Inventors: Guo-Kiang Hung, Zhubei (TW); Hsuan-I Pan, Zhubei (TW); Kai-Ting Ho, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 65 days.

(21) Appl. No.: 14/160,821

(22) Filed: Jan. 22, 2014

(65) Prior Publication Data

US 2014/0204057 A1    Jul. 24, 2014

(30) Foreign Application Priority Data

Jan. 23, 2013    (TW) .............. 102102511 A

(51) Int. Cl.
  *G06F 3/044*    (2006.01)
  *G06F 3/041*    (2006.01)

(52) U.S. Cl.
  CPC .............. *G06F 3/044* (2013.01); *G06F 3/0416* (2013.01)

(58) Field of Classification Search
  CPC ................... G06F 3/044; G06F 3/0416
  See application file for complete search history.

(56) References Cited

U.S. PATENT DOCUMENTS

| | | | | |
|---|---|---|---|---|
| 2007/0176682 | A1* | 8/2007 | Nakamura et al. | 330/278 |
| 2010/0238121 | A1* | 9/2010 | Ely | 345/173 |
| 2013/0300692 | A1* | 11/2013 | Jang et al. | 345/173 |
| 2013/0321323 | A1* | 12/2013 | Salaverry | 345/174 |

FOREIGN PATENT DOCUMENTS

CN    101960415 A    1/2011

OTHER PUBLICATIONS

Taiwan Office Action, Oct. 27, 2014, 4 pages.

* cited by examiner

*Primary Examiner* — Andrew Sasinowski
(74) *Attorney, Agent, or Firm* — Edell, Shapiro & Finnan, LLC

(57) ABSTRACT

A driving apparatus for an electrode in a capacitive touch control system is provided. The driving apparatus includes a signal generating module and an adjusting module. The signal generating module generates a driving signal. The adjusting module is connected between the signal generating module and the electrode, and generates an adjusted signal according to the driving signal to replace the driving signal. The adjusting module controls a rising edge or a falling edge of the waveform of the adjusted signal, so that a high-frequency component in the adjusted signal is less than that in the driving signal.

4 Claims, 3 Drawing Sheets

CAPACITIVE TOUCH CONTROL SYSTEM AND DRIVING APPARATUS THEREOF

This application claims the benefit of Taiwan application Serial No. 102102511, filed Jan. 23, 2013, the subject matter of which is incorporated herein by reference.

BACKGROUND OF THE INVENTION

1. Field of the Invention

The invention relates in general to a touch control system, and more particularly to a capacitive touch control system.

2. Description of the Related Art

Accompanied with ever-progressing technologies, operating interfaces of recent electronic products have become increasingly user-friendly and intuitive. For example, through a touch screen, a user can directly interact with applications as well as input messages/texts/patterns with fingers or a stylus, thus eliminating complications associated with other input devices such as a keyboard or buttons. Existing capacitive touch sensing technologies can be roughly categorized into resistive, capacitive, electromagnetic sensing, ultrasonic and optical types.

A capacitive touch control panel includes multiple electrodes, whose capacitance values are changed due to a user touch. By detecting and measuring the changes in the capacitance of the electrodes, a position of a touch point can be determined. Taking the mutual capacitive touch control technology for example, transparent electrodes forming a matrix pattern are disposed at the back of a sensing panel, as shown in FIG. 1. In this example, the electrodes parallel to the x-direction are driving electrodes, and the electrodes parallel to the y-direction are receiving electrodes. Each of the driving electrodes is connected to a driver 12, and each of the receiving electrodes is connected to a receiver 14. The drivers 12 sequentially send out driving signals, and the receivers 14 sequentially receive sensing signals. When a touch event takes place, capacitance coupling is caused between the driving electrode and the receiving electrode corresponding to the touch point, giving rise to a change in the sensing signal associated with the mutual capacitance. According to the position of the receiver 14 that detects the change in the sensing signal and the position of the driver 12 that sends out the driving signal at the time of the touch event, a subsequent circuit may determine the x-coordinate and y-coordinate of the touch point.

The driving signals sent by the drivers 12 are generally square wave signals. As known to a person having ordinary skill in the art, an ideal square wave signal is consisted of sinusoidal waves of different frequencies. As slopes of rising edges and falling edges of a square wave signal get steeper, a part constituted by a high-frequency component in the square wave signal gets larger. For a mobile communication device (e.g., a smart phone) adopting a touch control screen, the high-frequency component in the driving signals pose interference on neighboring communication circuits, even leading to performance degradation of those circuits. As shown in FIG. 1, a distribution range of the driving electrodes is directly proportional to the size of the sensing panel. That is to say, all circuits near the sensing panel are exposed to potential interference from the driving signals, which resultantly create a quite large influence range.

SUMMARY OF THE INVENTION

The invention is directed to a capacitive touch control system and an electrode driving apparatus thereof. In the present invention, by reducing a high-frequency component in an electrode driving signal, interference posed by the electrode driving signal on other peripheral circuits can be mitigated.

According to an embodiment of the present invention, a driving apparatus for an electrode in a capacitive touch control system is provided. The driving apparatus includes a signal generating module and an adjusting module. The signal generating module generates a driving signal. The adjusting module is connected between the electrode and the signal generating module, and generates an adjusted signal according to the driving signal to replace the driving signal. The adjusting module controls a rising edge or a falling edge of the waveform of the adjusted signal, so that a high-frequency component in the adjusted signal is less than that in the driving signal.

According to another embodiment of the present invention, a capacitive touch control system is provided. The touch control system includes an electrode, a signal generating module and an adjusting module. The signal generating module generates a driving signal. The adjusting module is connected between the electrode and the signal generating module, and generates an adjusted signal according to the driving signal to replace the driving signal. The adjusting module controls the waveform of a rising edge or a falling edge of the adjusted signal, so that a high-frequency component in the adjusted signal is less than that in the driving signal.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
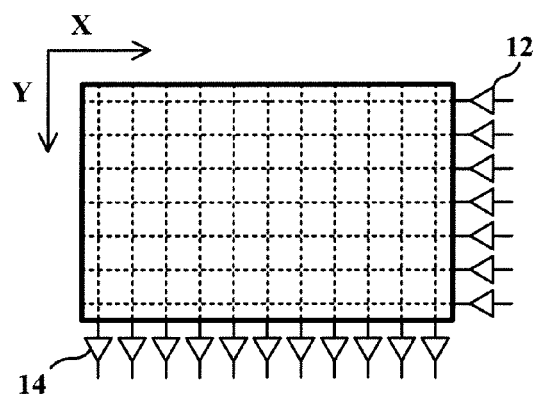
FIG. 1 is an example of electrodes and wires in a touch control sensing apparatus.
Figure 2:
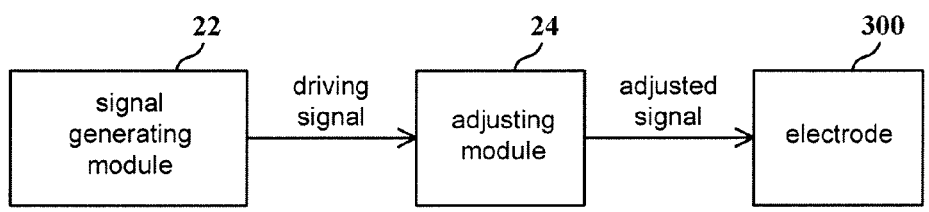
FIG. 2 is a block diagram of a driving apparatus according to an embodiment of the present invention.

FIG. 2 shows a function block diagram of a driving apparatus for an electrode in a capacitive touch control system according to an embodiment of the present invention. The driving apparatus includes a signal generating module 22 and an adjusting module 24. The signal generating module 24 generates a driving signal $V_D$. The adjusting module 24 is connected between an electrode 300 and the signal generating module 22, and, generates an adjusted signal $V_A$, according to the driving signal $V_D$, that replaces the driving signal $V_D$. As shown in FIG. 2, the signal that drives the electrode 300 is the adjusted signal $V_A$ instead of the driving signal $V_D$. Please note that high-frequency component in the adjusted signal $V_A$ in less than that in the driving signal $V_D$.

Figure 3A:
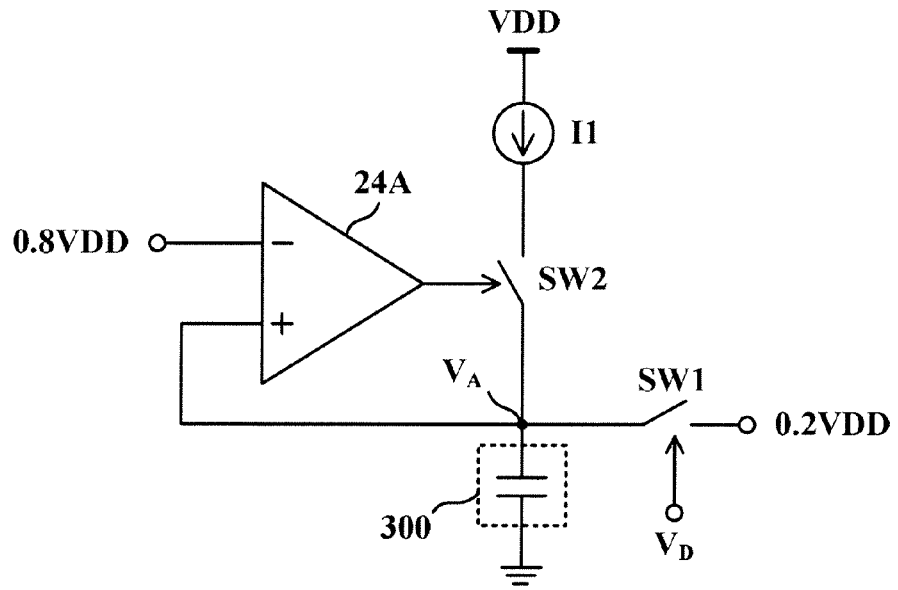
FIG. 3(A) shows details of an exemplary internal circuit of an adjusting module according to an embodiment of the present invention.
Figure 3B:
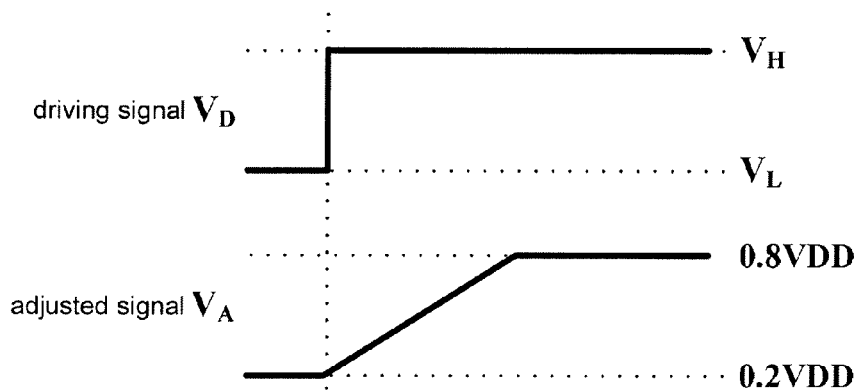
FIG. 3(B) is a corresponding signal timing diagram.

In one embodiment, the adjusting module 24 reduces the high-frequency component in the adjusted signal $V_A$ by moderating slope of a rising edge of the adjusted signal $V_A$. FIG. 3(A) shows details of an exemplary internal circuit of the adjusting module 24; FIG. 3(B) shows a corresponding signal timing diagram. In this example, the adjusting module 24 includes a reference voltage source (not shown), a first switch SW1, a second switch SW2, a charging current source I1 and an operational amplifier 24A. The reference voltage source has two voltage supply ends with output voltages 0.2VDD and 0.8VDD, respectively, where VDD represents a supply voltage of the circuit. In practice, the electrode 300 is equivalent to a capacitor, and is thus represented by a capacitor symbol in FIG. 3(A).

The first switch SW1 is connected between the 0.2VDD voltage supply end and the electrode 300, and is controlled by the driving signal $V_D$. When the driving signal $V_D$ is in a first state (having a voltage $V_L$ in this example), the first switch SW1 is switched to close circuit (turned on). In contrast, when the driving signal $V_D$ is a second state (having a voltage $V_H$ in this example), the first switch SW1 is switched to open circuit (turned off).

The second switch SW2 is connected between the charging current source I1 and the electrode 300, and is controlled by an output signal from the operational amplifier 24A. When the voltage at the positive input end of the operational amplifier 24A is lower than the voltage at the negative input end, the second switch SW2 is turned on. When the voltage at the positive input end of the operational amplifier 24A is higher than the voltage at the negative input end, the second switch SW2 is turned off.

Referring to FIG. 3(A), when the first switch SW1 is turned on, the cross voltage of the electrode 300 (i.e., the voltage of the adjusted signal VA) is equal to 0.2VDD. At this point, since the voltage (0.2VDD) at the positive input end of the operational amplifier 24A is lower than the voltage (0.8VDD) at the negative input end, the second switch SW2 is turned on. Once the first switch SW1 is later turned from on to off as being affected by the driving signal $V_D$, the charging current I1 supplied by the charging current source I1 starts charging the electrode 300 such that the voltage of the adjusted signal $V_A$ continues to rise. Assuming that the equivalent capacitance of the electrode 300 is C, the voltage of the adjusted voltage $V_A$ rises at an increasing slope that is substantially equal to I1/C. Only when the voltage of the adjusted signal $V_A$ reaches slightly higher than 0.8VDD, the output signal from the operational amplifier 24A turns the second switch SW2 from on to off such that the charging current source I1 stops charging the electrode 300. Given a sufficient equivalent capacitance of the electrode 300, the voltage of the adjusted signal $V_A$ can be maintained at approximately 0.8VDD.

Referring to FIG. 3(B), the rising edge of the adjusted signal $V_A$ appears more moderate compared to that of the driving signal $V_D$, and thus includes a less high-frequency component. For that the driving signal $V_D$ is controls only the first switch SW1 rather than the entire electrode 300, a region affected by the high-frequency component in the driving signal $V_D$ is noticeably smaller than that in the prior art. That is to say, in large, the signal generated by the driving apparatus according to the present invention poses less interference on other circuits.

It can be easily appreciated by a person having ordinary skill in the art that, the two voltage states of the driving signal $V_D$ are not limited to the exemplary VL and VH, and the range of potential change of the adjusted signal is not limited to 0.2VDD to 0.8VDD either. Further, the waveform of the driving signal $V_D$ is not limited to square waves.

Figure 4A:
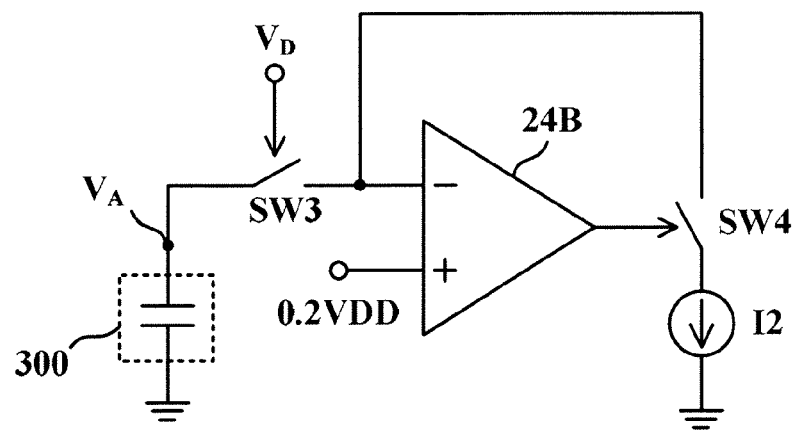
FIG. 4(A) shows details of another exemplary internal circuit of an adjusting module according to an embodiment of the present invention.
Figure 4B:
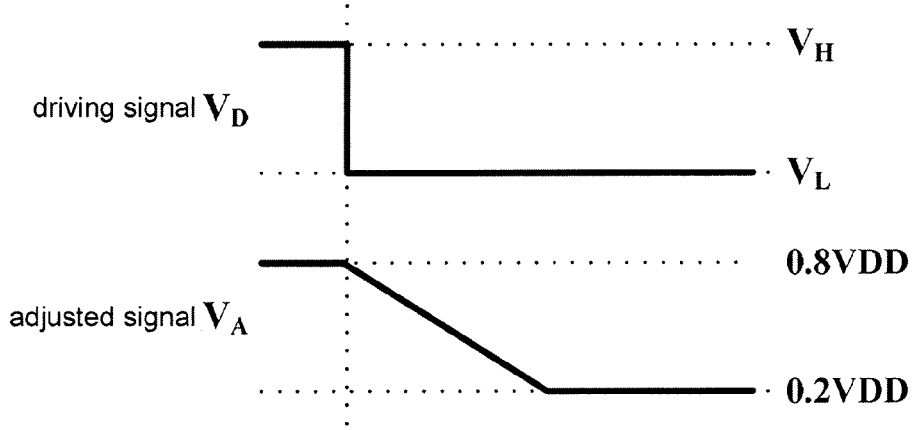
FIG. 4(B) is a corresponding timing diagram.

In another embodiment, the adjusting module 24 decreases the high-frequency component in the adjusted signal by moderating the slope of a falling edge of the adjusted signal $V_A$. FIG. 4(A) shows an exemplary detailed internal circuit of the adjusting module 24; FIG. 4(B) shows a corresponding signal timing diagram. In this example, the adjusting module 24 includes a reference voltage source (not shown), a third switch SW3, a fourth switch SW4, a discharging current source I2 and an operational amplifier 24B. The output voltage of the reference voltage source is 0.2VDD, where VDD represents the supply voltage of the circuit. The electrode 300 is in equivalence a capacitor, and is thus represented by a capacitor symbol in FIG. 4(A).

The third switch SW3 is connected between the electrode 300 and the negative input end of the operational amplifier 24B, and is controlled by the driving signal $V_D$. When the driving signal $V_D$ is in a first state (having a voltage $V_L$ in this example), the third switch SW3 is turned on. In contrast, when the driving signal $V_D$ is a second state (having a voltage $V_H$ in this example), the third switch SW3 is turned off.

The fourth switch SW4 is connected between the discharging current I2 and the output end of the operational amplifier 24B, and is controlled by an output signal from the operational amplifier 24B. When the voltage at the positive input end of the operational amplifier 24B is lower than the voltage at the negative input end, the fourth switch SW4 is turned on. When the voltage at the positive input end of the operational amplifier 24B is higher than the voltage of the negative input end, the fourth switch SW4 is turned off.

Referring to FIG. 4(A), when the third switch SW3 is turned off, the circuit at the right side of the third switch SW3 does not cause effect to the electrode 300. It is assumed that the cross voltage of the electrode 300 is 0.8VDD before the third switch SW3 is turned off. Once the third switch SW3 is turned on by the driving signal $V_D$, the voltage (0.2VDD) at the positive input end of the operational amplifier 24B becomes lower than the voltage (0.8VDD) at the negative input end, and thus the fourth switch SW4 is turned on. The discharging current $I_2$ supplied by the discharging current source I2 starts discharging the electrode 300, which makes the voltage of the adjusted signal VA become lower and lower. Assuming that the equivalent capacitance of the electrode 300 is C, the voltage of the adjusted voltage VA drops at a decreasing slope that is substantially equal to $I_2/C$. Only when the voltage of the adjusted signal $V_A$ is slightly lower than 0.2VDD, the output signal from the operational amplifier 24B turns the fourth switch SW4 from on to off such that the discharging current source I2 stops discharging the electrode 300. Given a sufficient equivalent capacitance of the electrode 300, the voltage of the adjusted signal $V_A$ can be subsequently maintained at approximately 0.2VDD.

Referring to FIG. 4(B), the falling edge of the adjusted signal VA appears more moderate compared to that of the driving signal $V_D$, and thus includes a less high-frequency component. For that the driving signal $V_D$ controls only the third switch SW3 rather than the entire electrode 300, a region affected by the high-frequency component in the driving signal $V_D$ is noticeably smaller than that in the prior art. That is to say, as a whole, the signal generated by the driving apparatus according to the present invention poses less interference on other circuits.

It should be noted that, the charging circuit in FIG. 3(A) and the discharging circuit in FIG. 4(B) can be individually or jointly implemented. In other words, the adjusting module 24 may control either the slope of the rising edge of the adjusted signal $V_A$ or the slope of the falling edge of the adjusted signal $V_A$, or may at the same time control both of the slope of the rising edge and the slope of the falling edge of the adjusted signal $V_A$. Either of the approaches above capably reduces the high-frequency component in the adjusted signal $V_A$. It can be easily appreciated by a person having ordinary skill in the art that, instead of the slanted straight lines in FIGS. 3(B) and 4(B), the waveform of the rising edge or the falling edge of the adjusted signal $V_A$ may include curved lines. Given that the adjusted signal $V_A$ includes a less high-frequency component, the effect of reducing the interference posed by the high-frequency component can be achieved.

As disclosed, with the capacitive touch control system and the electrode driving apparatus thereof, the interference posed by an electrode driving signal on other peripheral circuits can be reduced through decreasing the high-frequency component in the electrode driving signal.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A driving apparatus, adopted to an electrode in a capacitive touch control system, the driving apparatus comprising:
   a signal generating module, configured to generate a driving signal; and
   an adjusting module, connected between the electrode and the signal generating module, that generates an adjusted signal according to the driving signal to replace the driving signal, and that controls a rising edge or a falling edge of a waveform of the adjusted signal such that a high-frequency component in the adjusted signal is less than that in the driving signal,
   wherein the adjusting module comprises:
   a reference voltage source, comprising a first voltage supply end and a second voltage supply end, a first voltage output from the first voltage supply end being lower than a second voltage output from the second voltage supply end;
   a first switch, connected between the first voltage supply end and the electrode, the first switch being turned on when the driving signal is in a first state and being turned off when the driving signal is in a second state;
   a charging current source, configured to supply a charging current;
   a second switch, connected between the charging current and the electrode; and
   an operational amplifier, comprising a positive input end, a negative input end and an output end, the positive input end being connected to the electrode, the negative input end being connected to the second voltage supply end, the output end configured to control the second switch;
   wherein, the second switch is turned on when a voltage at the positive input end is lower than a voltage at the negative input end, and is turned off when the voltage at the positive input end is higher than the voltage at the negative input end.

2. The driving apparatus according to claim 1, wherein the adjusting module comprises:
   a reference voltage source, configured to output a first voltage;
   a discharging current source, configured to supply a discharging current;
   an operational amplifier, comprising a positive input end, a negative input end and an output end, the positive input end being connected to the reference voltage source;
   a third switch, connected between the negative input end and the electrode, the third switch being turned on when the driving signal is in a first state and being turned off when the driving signal is in a second state;
   a fourth switch, connected between the discharging current source and the output end; and
   a capacitor, connected between the negative input end and the fourth switch;
   wherein, the fourth switch is turned on when a voltage at the positive input end is lower than a voltage at the negative input end, and is turned off when the voltage at the positive input end is higher than the voltage at the negative input end.

3. A touch control system, comprising:
   an electrode;
   a signal generating module, configured to generate a driving signal; and
   an adjusting module, connected between the electrode and the signal generating module, that generates an adjusted signal according to the driving signal to replace the driving signal, and that controls a rising edge or a falling edge of a waveform of the adjusted signal such that a high-frequency component in the adjusted signal is less than that in the driving signal,
   wherein the adjusting module comprises:
   a reference voltage source, comprising a first voltage supply end and a second voltage supply end, a first voltage output from the first voltage supply end being lower than a second voltage output from the second voltage supply end;
   a first switch, connected between the first voltage supply end and the electrode, the first switch being turned on when the driving signal is in a first state and being turned off when the driving signal is in a second state;
   a charging current source, configured to supply a charging current;
   a second switch, connected between the charging current and the electrode; and
   an operational amplifier, comprising a positive input end, a negative input end and an output end, the positive input end being connected to the electrode, the negative input end being connected to the second voltage supply end, the output end configured to control the second switch;
   wherein, the second switch is turned on when a voltage at the positive input end is lower than a voltage at the negative input end, and is turned off when the voltage at the positive input end is higher than the voltage at the negative input end.

4. The touch control system according to claim 3, wherein the adjusting module comprises:
   a reference voltage source, configured to output a first voltage;
   a discharging current source, configured to supply a discharging current;
   an operational amplifier, comprising a positive input end, a negative input end and an output end, the positive input end being connected to the reference voltage source;
   a third switch, connected between the negative input end and the electrode, the third switch being turned on when the driving signal is in a first state and being turned off when the driving signal is in a second state;
   a fourth switch, connected between the discharging current source and the output end; and
   a capacitor, connected between the negative input end and the fourth switch;
   wherein, the fourth switch is turned on when a voltage at the positive input end is lower than a voltage at the negative input end, and is turned off when the voltage at the positive input end is higher than the voltage at the negative input end.

* * * * *